Patented Oct. 11, 1938

2,132,505

UNITED STATES PATENT OFFICE 2,132,505

PLASTICIZING RUBBER

Ira Williams, Woodstown, and Carroll Cummings Smith, Carneys Point, N. J., assignors to E. I. du Pont de Nemours & Company, Wilmington, Del., a corporation of Delaware No Drawing. Application August 15, 1935, Serial No. 36,324

38 Claims. (Cl. 18—50)

This invention relates to the manufacture of rubber articles and more particularly to methods of treating rubber to produce a more plastic product.

It is well known that rubber, when subjected to mechanical working, such as is obtained by the use of a rubber mill, and especially in the presence of oxygen, is rendered much more plastic. The degree of plasticizing is determined to a great extent by the temperature and time of milling. When milled for a sufficient length of time, rubber will become very soft and at the same time will lose much of its ability to vulcanize. In order to reduce the time of milling and to prevent the deteriorating action of continued milling, it is common practice to add to the rubber, during the milling operation, certain materials which assist in producing softness.

The materials which are commonly used are oils, esters, waxes, fats, alcohols, acids, resins, etc., which assist the production of soft rubber either by a swelling action on the rubber or by acting as a lubricant. Some of the more common softeners are mineral oil, pine tar, palm oil, rosin oil, di-, butyl phthalate, paraffin, glycerine, lauryl alcohol and stearic acid. It is also known that certain chemicals, such as diphenyl guanidine, have a slight softening action on the rubber while other products, such as benzidine, have a considerable stiffening action.

Rubber which has been subjected to the action of swelling agents, such as mineral oil, kerosene and similar materials, is softened merely by the distending action of the swelling materials and the degree of softening and swelling can be increased until the rubber assumes the consistency of a soft jelly or cement. When such rubber is compounded with the usual vulcanizing agents and vulcanized, the swelling action of the softener still persists and the vulcanized rubber has a low modulus of elasticity and is inferior for many purposes.

Rubber is probably composed of micelles which in turn consist of a larger number of molecules. The softness or plasticity of the rubber is largely determined by the state of gelation and size of the micelles. Any reduction in the degree of association of the micelles or any means which will reduce the size of the micelle will result in a softening action. Such peptizing actions are shown by certain accelerators, such as diphenyl guanidine, although the effect is almost entirely destroyed during vulcanization.

An object of the present invention is to provide a class of materials which, when added to rubber in small amounts, will have a greater plasticizing action than those previously employed. A further object is to supply a class of materials which cause softening when used in relatively small amounts and without producing a material swelling action on the rubber. A still further object is to supply a class of plasticizers for rubber, the effect of which is largely destroyed during vulcanization. Another object is to supply a method of softening rubber by means other than mechanical. Other objects are to provide new compositions of matter and to advance the art. Still other objects will appear hereinafter.

These objects may be accomplished in accordance with our invention which comprises plasticizing unvulcanized rubber by subjecting the rubber to the action of a small amount of a complex organic compound which is a chemical addition product of a metal salt and an unsymmetrically substituted hydrazine for a sufficient length of time to produce a substantial increase in the plasticity of the rubber. The rubber is subsequently shaped into the desired form and, if desired, vulcanized.

By the term "chemical addition product" we mean the product formed by causing the metal salts to react upon the hydrazine chemically so that the metal salt is added on to the hydrazine to form a complex salt or compound but without destroying the fundamental structure of the hydrazine. These products are somewhat similar to quaternary ammonium compounds.

These compounds of our invention apparently reduce the degree of association of the micelles in the rubber or reduce the size of the micelles to a much greater extent than any other compounds heretofore known for this purpose. The change, in the state of the rubber gel induced by our compounds, is not instantaneous but requires more or less time to develop. While a small immediate effect may result, it is, in general, not great enough to be noticeable. However, upon standing for a period of time, the rubber, containing our compounds, becomes softened and continues to become softened until the effect is sufficient to be easily detectable by hand testing methods. This softening effect continues at a decreasing rate until an apparent equilibrium condition is reached, after which little or no further softening takes place. The length of time required to reach this equilibrium varies considerably for different compounds and decreases rapidly as the temperature is increased. A beneficial softening action will in general be noticed in periods of time which may vary from 15 minutes to two days. Also, the amount of softening, which will be obtained over a given period of time, will vary with the amount of plasticizing agent which is employed. However, the increase in softening effect of increased amounts of agent is not in proportion to the amount of agent added. The amount of agent to be added may be varied within an extremely wide range, depending upon the rubber, the other compounding ingredients and the desire of the user. However, for economical reasons, it will generally be found that from .1 to about 5% of the agent will be sufficient for most purposes. Also, the amount of softener required will be reduced if the rubber is held at an elevated temperature after treatment.

The metal salts may be the salts formed from any metal and any acid reacting material which metal salt will form addition products with the hydrazines and without destroying such hydrazine. In general, the salts of the metals from lithium to lead in the electromotive series will be found to be the most suitable. Of these, the most satisfactory metal salts will be those prepared from lithium, boron, calcium, magnesium, manganese, zinc, cadmium, iron, cobalt, nickel and lead. The most satisfactory compounds which we have employed are those prepared from zinc and cadmium. Among the salts which have proved to be particularly satisfactory are the halides such as the chlorides, chloroplatinates, bromides, and iodides; the nitrates, sulfates, phosphates, formates, acetates, propionates, benzoates, thiocyanates, borates and like salts which are sufficiently soluble or fusible to permit the double salt to be formed. Of these, the chlorides are generally preferred.

The term "unsymmetrically substituted hydrazines" means the free bases or derivatives thereof which release the free bases to produce the complex compound. This term includes the N,N' disubstituted hydrazines in which the two substituents are basically different as, for example, one being aromatic and the other aliphatic as well as the mono substituted hydrazines. The class of unsymmetrically substituted hydrazines may be represented by the formula

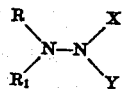

wherein R represents an alkyl, aralkyl or aryl nucleus, $R_1$ represents hydrogen or an alkyl, aralkyl or aryl nucleus, X represents hydrogen, one valence of a double bonded carbon atom, or an alkyl, aralkyl or aryl nucleus but must be of a different class than R when $R_1$ is hydrogen, and Y represents hydrogen or one valence of a doubly bonded carbon atom. R and $R_1$ may also represent terminal carbon atoms of a cyclic group in which the nitrogen to which they are attached forms part of the cycle as in the morpholyl, piperidyl and like groups.

The statement that X must be of a different class than R when $R_1$ is hydrogen, means that X must not be aryl when R is aryl and $R_1$ and Y are hydrogens and that X must not be aliphatic when R is aliphatic and $R_1$ and Y are hydrogens.

One valence of a doubly bonded carbon atom, as employed in the above definitions and in the claims, will be understood to include compounds in which both the X and the Y valences are connected to the same carbon atom as in compounds represented by the formula

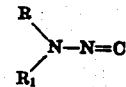

and to include compounds in which the valence is of a carbon atom which is doubly bonded to some element other than carbon as in the compounds represented by the formulae

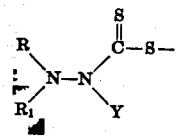

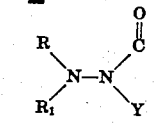

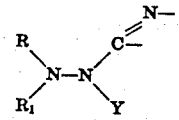

By the expression "an alkyl, aralkyl or aryl nucleus," it will be understood that the indicated group is bonded to the nitrogen directly by means of a carbon atom of such nucleus. Such nuclei may contain hydroxy, alkoxy, nitro, halogen or amino substituents. Also, the term "alkyl" includes both saturated and unsaturated aliphatic radicals.

The hydrazines, which in general will be found to be most useful, are the mono-substituted and asymmetrical disubstituted hydrazines containing not more than one aryl group connected directly to the nitrogen or those hydrozines in which one nitrogen forms part of a cyclic structure. Amongst the compounds which we have found to be most satisfactory are: Those prepared from:

1 mole $ZnCl_2$ and 2 moles phenyl hydrazine.
1 mole $ZnCl_2$ and 2 moles p-tolyl hydrazine.
1 mole $PbCl_2$ and 2 moles phenyl hydrazine.
1 mole zinc propionate and 2 moles phenyl hydrazine.
1 mole $ZnCl_2$ and 2 moles penta methylene hydrazine.
1 mole $CdCl_2$ and 2 moles phenyl hydrazine.

These materials are employed by either milling them into the rubber or dusting the surface or spraying the surface of the rubber with a solution or suspension of the material. The softening action as hereinbefore pointed out begins at once, and continues over a period of time which depends upon the temperature and the composition of the rubber. With the zinc chloride and phenyl hydrazine addition product, the maximum softening will be reached in about 8 days at 25° C. or in about 20 hours at 70° C. The zinc chloride penta methylene hydrazine addition product will produce the maximum softening in about 4 hours at 70 C.

The use of these materials is illustrated by the following example:

Example

One percent of the hydrazine derivative was milled into rubber with as little milling as possible and the rubber was held at 70° C. for 24 hours. The relative plasticity was determined by measuring the thickness of a 2 cubic centimeter pellet after being pressed between parallel plates under a load of 2 kg. for 5 minutes at 70° C. The plasticity number is the final thickness in thousandths of an inch.

| Material | Plasticity number |
|---|---|
| Control | 200 |
| $ZnCl_2$ phenyl hydrazine | 86 |
| $ZnCl_2$ p-tolyl hydrazine | 90 |
| $PbCl_2$ phenyl hydrazine | 120 |
| Zinc propionate phenyl hydrazine | 102 |
| $CdCl_2$ phenyl hydrazine | 97 |

It has been found that the presence of sulfur and of certain pigments such as carbon black exert a retarding action on the rate of the softening of the rubber by means of our compounds. When these ingredients are present in the rubber mix, a longer ageing period and usually a greater amount of plasticizing agent is required. When these agents are to be employed in the rubber, it will, in general, be preferred to treat the rubber with our compounds followed by the development of the desired softness before the sulfur, pigment and other rubber compounding ingredients are incorporated therein. By this process the use of large amounts of the softening agent and long ageing periods will be largely obviated.

Other compounds which have proved to be satisfactory are:

| | |
|---|---|
| 1 mole $BCl_3$ | 3 moles phenyl hydrazine |
| 1 mole LiCl | 2 moles phenyl hydrazine |
| 1 mole $ZnBr_2$ | 2 moles phenyl hydrazine |
| 1 mole $ZnI_2$ | 2 moles phenyl hydrazine |
| 1 mole $CdBr_2$ | 2 moles phenyl hydrazine |
| 1 mole $CdI_2$ | 2 moles phenyl hydrazine |
| 1 mole $ZnI_2$ | 5 moles phenyl hydrazine |
| 1 mole $CoPtCl_4$ | 2 moles phenyl hydrazine |
| 1 mole $NiCl_2$ | 2 moles phenyl hydrazine |
| 1 mole $NiCl_2$ | 5 moles phenyl hydrazine |
| 1 mole $MgCl_2$ | 2 moles phenyl hydrazine |
| 1 mole $CoCl_2$ | 2 moles phenyl hydrazine |
| 1 mole $CoCl_2$ | 4 moles phenyl hydrazine |
| 1 mole $Zn(NO_3)_2$ | 3 moles phenyl hydrazine |
| 1 mole $Cd(NO_3)_2$ | 3 moles phenyl hydrazine |
| 1 mole $Co(NO_3)_2$ | 3 moles phenyl hydrazine |
| 1 mole $ZnSO_4$ | 2 moles phenyl hydrazine |
| 2 moles $ZnSO_4$ | 3 moles phenyl hydrazine |
| 1 mole $Zn(CH_3COO)_2$ | 2 moles phenyl hydrazine |
| 1 mole $Zn(HCOO)_2$ | 2 moles phenyl hydrazine |
| 1 mole Zn Benzoate | 2 moles phenyl hydrazine |
| 1 mole Zn Furoate | 2 moles phenyl hydrazine |
| 1 mole $ZnCl_2$ | 2 moles o-tolyl hydrazine |
| 1 mole $ZnCl_2$ | 2 moles m-tolyl hydrazine |
| 1 mole $PbCl_2$ | 2 moles p-tolyl hydrazine |
| 1 mole $CdCl_2$ | 2 moles p-tolyl hydrazine |
| 1 mole $Zn(CH_3COO)_2$ | 2 moles p-tolyl hydrazine |
| 1 mole $ZnCl_2$ | 2 moles a-naphthyl hydrazine |
| 1 mole $ZnCl_2$ | 2 moles b-naphthyl hydrazine |
| 1 mole $ZnCl_2$ | 1 mole phenyl ethyl hydrazine |
| 1 mole $ZnCl_2$ | 2 moles penta methylene hydrazine |

Other compounds may be prepared from other hydrazines such as: phenyl hydrazine, o-tolyl hydrazine, asymmetrical diphenyl hydrazine, phenyl dithio carbamic phenyl hydrazine (phenyl hydrazine $CS_2$ reaction product), N,N' b-oxy ethyl phenyl hydrazine, alpha naphthyl hydrazine, acetone phenyl hydrazone, asymmetrical dilauryl hydrazine, N,N' phenyl benzyl hydrazine, mono acetyl phenyl hydrazine, the thiourea resulting from the action of phenyl mustard oil on phenyl hydrazine, o-xenyl hydrazine, the reaction product of phenyl hydrazine and carbon dioxide, phenyl hydrazine reacted with sulfur dioxide, ethyl sulphonyl derivative of 2:5-dichlorphenyl hydrazine, benzoyl derivative of 2:5-dichlorphenyl hydrazine, m-nitrophenyl hydrazine, p-nitrophenyl hydrazine, 2:5-dichlorphenyl hydrazine, phenyl hydrazine formaldehyde reaction product, methyl propyl ketone phenyl hydrazone, o-tolyl hydrazonium salt of the dithiocarbamic acid of o-tolyl hydrazine, and asymmetrical phenyl methyl hydrazine.

Other hydrazines which merit special attention are: asymmetrical di-tolyl hydrazines, asymmetrical di-xylyl hydrazines, asymmetrical di-biphenyl hydrazines, asymmetrical di-naphthyl hydrazines, asymmetrical phenyl tolyl hydrazines, asymmetrical phenyl biphenyl hydrazines, asymmetrical phenyl naphthyl hydrazines, asymmetrical tolyl naphthyl hydrazines, asymmetrical di-benzyl hydrazines, asymmetrical phenyl benzyl hydrazines, asymmetrical di-hydroxyphenyl hydrazines, asymmetrical di-chlorphenyl hydrazines, asymmetrical di-p-aminophenyl hydrazines, asymmetrical phenyl phenol hydrazines, asymmetrical tolyl phenol hydrazines, asymmetrical di-anisyl hydrazines, asymmetrical phenyl anisyl hydrazines, asymmetrical methyl phenyl hydrazines, mono xylyl hydrazines, mono biphenyl hydrazines, mono hydroxy phenyl hydrazines, mono benzyl hydrazines, mono chlorphenyl hydrazines, mono aminophenyl hydrazines, mono anisyl hydrazines, mono methyl hydrazines, mono lauryl hydrazines, dichlorphenyl hydrazines, and nitrophenyl hydrazines.

Among the metal salts which may be mentioned are the metallic salts of the following acid reacting materials: hydrochloric acid, hydriodic acid, hydrobromic acid, thiocyanic acid, boric acid, phenol, b-naphthol, cresols, alpha naphthol, xylenols, catechol, dihydroxy naphthalenes, dihydroxy biphenyls, formic acid, furoic acid, stearic acid, oxalic acid, acetic acid, benzoic acid, phthalic acid, propionic acid, butyric acid, oleic acid, palmitic acid, sulfonic acids, naphthoic acid, phenyl benzoic acid, phenyl naphthoic acid, naphthyl benzoic acid, naphthyl naphthoic acid, halogen substituted acids, chlor acetic acids (mono- and di-), anthranilic acids, anthracene carboxylic acids, nitric acid, sulfuric acid, phosphoric acid, chlorplatinic acid, sulphur dioxide, carbon dioxide, ethyl sulfonic acid, dithiocarbamic acid of phenyl hydrazine, dithiocarbamic acid of o-tolyl hydrazine, and other dithiocarbamic acids.

It will be apparent that a wide variety of hydrazines may be employed to produce complex organic compounds to be employed in accordance with our invention. Within the limits of the type formula—

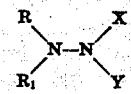

as defined hereinbefore, the components R, $R_1$ and X may represent methyl, ethyl, propyl, butyl, isobutyl, tertiary butyl, amyl, isoamyl, allyl, crotyl, butylene, lauryl, stearyl or other saturated or unsaturated alkyl group or may be benzyl, ring substituted benzyl, naphthyl methyl or other aralkyl groups or may be substituted or unsubstituted aromatic radicals such as dimethylphenyl, ethylphenyl, nitrophenyl, chlorphenyl, aminophenyl, chlornaphthyl, nitronaphthyl, alkylnaphthyl, biphenyl, alkylbiphenyl, chlorbiphenyl, nitrobiphenyl, aminobiphenyl, cyclohexyl, and the like, or other groups which are generally known to be aliphatic or aromatic in nature.

Many of these complex organic compounds are known and described in the literature. A large number are described in Beilstein, Handbook der Organischen Chemie, vol. 4, 3rd edition, pages 653 and 654. Many other addition products can be formed by the methods described in this publication. Some of the addition products such as the phenyl or tolyl hydrazine zinc chloride complexes will precipitate simply by shaking the hydrazine with a solution of zinc chloride. Compounds may be obtained in a similar manner with a saturated solution or a slurry of lead chloride and hydrazines. Some of the metal salts combine with the hydrazines in equal molecular proportions. Other metal salts react with large proportions of the hydrazine in forming the complexes, according to the characteristics of the specific salts.

The complex organic compounds of our invention are very effective plasticizing agents and are particularly desirable because they are stable to oxidation during storage and are high melting solids relatively insoluble in water. They are also relatively nontoxic. For these reasons, our compounds are more desirable for the purpose than the free hydrazines. For example, while phenyl hydrazine is a liquid which is quite volatile at milling temperatures, the zinc iodide addition product is a solid melting at 175–180° C. While phenyl hydrazine is readily oxidized in the air, the zinc chloride addition product is not oxidized by long exposure at 100° C.

While we have disclosed the preferred embodiments of our invention, it will be readily apparent to those skilled in the art that many modifications and variations may be made therein without departing from the spirit of our invention. Accordingly, the scope of our invention is to be limited solely by the appended claims construed as broadly as is permissible in view of the prior art.

We claim:

1. In the process of making articles of rubber, the steps which comprise plasticizing unvulcanized rubber by subjecting the rubber to the action of a small amount of a complex organic compound, which is a chemical addition product of a metal salt and an unsymmetrically substituted hydrazine, for a sufficient length of time to produce a substantial increase in the plasticity of the rubber.

2. In the process of making articles of rubber, the steps which comprise plasticizing unvulcanized rubber by subjecting the rubber to the action of a small amount of a complex organic compound, which is a chemical addition product of a metal salt and an unsymmetrically substituted hydrazine having at least one valence of at least one nitrogen of the hydrazine nucleus satisfied by a hydrogen atom and having at least one valence of at least one nitrogen of the hydrazine nucleus satisfied by a carbon atom of an organic group, for a sufficient length of time to produce a substantial increase in the plasticity of the rubber.

3. In the process of making articles of rubber, the steps which comprise plasticizing unvulcanized rubber by subjecting the rubber to the action of a small amount of a complex organic compound, which is a chemical addition product of a salt of a metal between lithium and lead in the electromotive series and an unsymmetrically substituted hydrazine having at least one valence of at least one nitrogen of the hydrazine nucleus satisfied by a hydrogen atom and having at least one valence of at least one nitrogen of the hydrazine nucleus satisfied by a carbon atom of an organic group, for a sufficient length of time to produce a substantial increase in the plasticity of the rubber.

4. In the process of making articles of rubber, the steps which comprise plasticizing unvulcanized rubber by subjecting the rubber to the action of a small amount of a complex organic compound, which is a chemical addition product of a salt of a metal selected from the group of lithium, boron, calcium, magnesium, manganese, zinc, cadmium, ferrous iron, cobalt, nickel and lead and an unsymmetrically substituted hydrazine having at least one valence of at least one nitrogen of the hydrazine nucleus satisfied by a hydrogen atom and having at least one valence of at least one nitrogen of the hydrazine nucleus satisfied by a carbon atom of an organic group, for a sufficient length of time to produce a substantial increase in the plasticity of the rubber.

5. In the process of making articles of rubber, the steps which comprise plasticizing unvulcanized rubber by subjecting the rubber to the action of a small amount of a complex organic compound, which is a chemical addition product of a metal salt and an unsymmetrically substituted hydrazine containing at the most two substituent groups in which each of the substituent groups is an organic group having a carbon atom thereof directly bonded to a nitrogen of the hydrazine nucleus all substituents being on only one nitrogen, for a sufficient length of time to produce a substantial increase in the plasticity of the rubber.

6. In the process of making articles of rubber, the steps which comprise plasticizing unvulcanized rubber by subjecting the rubber to the action of a small amount of a complex organic compound, which is a chemical addition product of a metal salt and a mono-substituted hydrazine in which the substituent is an organic group having a carbon atom thereof directly bonded to a nitrogen of the hydrazine nucleus, for a sufficient length of time to produce a substantial increase in the plasticity of the rubber.

7. In the process of making articles of rubber, the steps which comprise plasticizing unvulcanized rubber by subjecting the rubber to the action of a small amount of a complex organic compound, which is a chemical addition product of a metal salt and an unsymmetrically substituted hydrazine containing at the most two substituent groups in which each of the substituent groups is an organic group having a carbon atom thereof directly bonded to a nitrogen of the hydrazine nucleus one and only one of said carbon atoms being in an aromatic ring and all substituents being on only one nitrogen, for a sufficient length of time to produce a substantial increase in the plasticity of the rubber.

8. In the process of making articles of rubber, the steps which comprise plasticizing unvulcanized rubber by subjecting the rubber to the action of a small amount of a complex organic compound, which is a chemical addition product of a metal salt and a mono-substituted hydrazine in which the substituent is an aromatic group having a ring carbon atom thereof directly bonded to a nitrogen of the hydrazine nucleus, for a sufficient length of time to produce a substantial increase in the plasticity of the rubber.

9. In the process of making articles of rubber, the steps which comprise plasticizing unvulcanized rubber by subjecting the rubber to the action of a small amount of a complex organic compound which is a chemical addition product of a salt of a metal selected from the group of lithium, boron, calcium, magnesium, manganese, zinc, cadmium, ferrous iron, cobalt, nickel and lead and an unsymmetrically substituted hydrazine containing at the most two substituent groups in which each of the substituent groups is an organic group having a carbon atom thereof directly bonded to a nitrogen of the hydrazine nucleus one and only one of said carbon atoms being in an aromatic ring and all substituents being on only one nitrogen, for a sufficient length of time to produce a substantial increase in the plasticity of the rubber.

10. In the process of making articles of rubber, the steps which comprise plasticizing unvulcanized rubber by subjecting the rubber to the action of a small amount of a complex organic compound, which is a chemical addition product of a salt of a metal selected from the group of lithium, boron, calcium, magnesium, manganese, zinc, cadmium, ferrous iron, cobalt, nickel and lead and a mono-substituted hydrazine in which the substituent is an aromatic group having a ring carbon atom thereof directly bonded to a nitrogen of the hydrazine nucleus, for a sufficient length of time to produce a substantial increase in the plasticity of the rubber.

11. Unvulcanized rubber of increased plasticity obtainable by subjecting the rubber to the action of a small amount of a complex organic compound, which is a chemical addition product of a metal salt and an unsymmetrically substituted hydrazine, for a sufficient length of time to produce a substantial increase in the plasticity of the rubber.

12. Unvulcanized rubber of increased plasticity obtainable by subjecting the rubber to the action of a small amount of a complex organic compound, which is a chemical addition product of a metal salt and an unsymmetrically substituted hydrazine having at least one valence of at least one nitrogen of the hydrazine nucleus satisfied by a hydrogen atom and having at least one valence of at least one nitrogen of the hydrazine nucleus satisfied by a carbon atom of an organic group, for a sufficient length of time to produce a substantial increase in the plasticity of the rubber.

13. Unvulcanized rubber of increased plasticity obtainable by subjecting the rubber to the action of a small amount of a complex organic compound, which is a chemical addition product of a salt of a metal of the group consisting of lithium, boron, calcium, magnesium, manganese, zinc, cadmium, ferrous iron, cobalt, nickel and lead and an unsymmetrically substituted hydrazine having at least one valence of at least one nitrogen of the hydrazine nucleus satisfied by a hydrogen atom and having at least one valence of at least one nitrogen of the hydrazine nucleus satisfied by a carbon atom of an organic group, for a sufficient length of time to produce a substantial increase in the plasticity of the rubber.

14. Unvulcanized rubber of increased plasticity obtainable by subjecting the rubber to the action of a small amount of a complex organic compound, which is a chemical addition product of a metal salt and an unsymmetrically substituted hydrazine containing at the most two substituent groups in which each of the substituent groups is an organic group having a carbon atom thereof directly bonded to a nitrogen of the hydrazine nucleus all substituents being on only one nitrogen, for a sufficient length of time to produce a substantial increase in the plasticity of the rubber.

15. Unvulcanized rubber of increased plasticity obtainable by subjecting the rubber to the action of a small amount of a complex organic compound, which is a chemical addition product of a metal salt and a mono-substituted hydrazine in which the substituent is an organic group having a carbon atom thereof directly bonded to a nitrogen of the hydrazine nucleus, for a sufficient length of time to produce a substantial increase in the plasticity of the rubber.

16. Unvulcanized rubber of increased plasticity obtainable by subjecting the rubber to the action of a small amount of a complex organic compound, which is a chemical addition product of a metal salt and an unsymmetrically substituted hydrazine in which only one nitrogen carries substituents, such substituents being terminal carbon atoms of a cyclic group forming with the nitrogen a heterocyclic ring, for a sufficient length of time to produce a substantial increase in the plasticity of the rubber.

17. Unvulcanized rubber of increased plasticity obtainable by subjecting the rubber to the action of a small amount of a complex organic compound, which is a chemical addition product of a salt of a metal selected from the group of lithium, boron, calcium, magnesium, manganese, zinc, cadmium, ferrous iron, cobalt, nickel and lead and an unsymmetrically substituted hydrazine containing at the most two substituent groups in which each of the substituent groups is an organic group having a carbon atom thereof directly bonded to a nitrogen of the hydrazine nucleus one and only one of said carbon atoms being in an aromatic ring and all substituents being on only one nitrogen, for a sufficient length of time to produce a substantial increase in the plasticity of the rubber.

18. Unvulcanized rubber of increased plasticity obtainable by subjecting the rubber to the action of a small amount of a complex organic compound, which is a chemical addition product of a salt of a metal selected from the group of lithium, boron, calcium, magnesium, manganese, zinc, cadmium, ferrous iron, cobalt, nickel and lead and a mono-substituted hydrazine in which the substituent is an aromatic group having a ring carbon atom thereof directly bonded to a nitrogen of the hydrazine nucleus, for a sufficient length of time to produce a substantial increase in the plasticity of the rubber.

19. In the process of making articles of rubber, the step which comprises plasticizing unvulcanized rubber by subjecting the rubber to the action of a small amount of a complex organic compound, which is a chemical addition product of a chloride of a metal between lithium and lead in the electromotive series and an unsymmetrically substituted hydrazine having at least one valence of at least one nitrogen of the hydrazine nucleus satisfied by a hydrogen atom and in which each substituent is an organic group joined to the nitrogen by means of a carbon atom, for a sufficient length of time to produce a substantial increase in the plasticity of the rubber.

20. In the process of making articles of rubber, the step which comprises plasticizing unvulcanized rubber by subjecting the rubber to the action of a small amount of a complex organic compound, which is a chemical addition product of a chloride of a metal between lithium and lead in the electromotive series and an unsymmetrically substituted hydrazine in which only one nitrogen carries substituents, each substituent being an organic group joined to the nitrogen by means of a carbon atom, for a sufficient length of time to produce a substantial increase in the plasticity of the rubber.

21. In the process of making articles of rubber, the step which comprises plasticizing unvulcanized rubber by subjecting the rubber to the action of a small amount of a complex organic compound, which is a chemical addition product of a chloride of a metal between lithium and lead in the electromotive series and a mono-substituted hydrazine in which the substituent is an aromatic group having a ring carbon atom thereof directly bonded to a nitrogen of the hydrazine nucleus, for a sufficient length of time to produce a substantial increase in the plasticity of the rubber.

22. In the process of making articles of rubber, the step which comprises plasticizing unvulcanized rubber by subjecting the rubber to the action of a small amount of a complex organic compound, which is a chemical addition product of a chloride of a metal between lithium and lead in the electromotive series and phenyl hydrazine, for a sufficient length of time to produce a substantial increase in the plasticity of the rubber.

23. In the process of making articles of rubber, the steps which comprise plasticizing unvulcanized rubber by subjecting the rubber to the action of a small amount of a complex organic compound, which is a chemical addition product of a metal salt and phenyl hydrazine, for a sufficient length of time to produce a substantial increase in the plasticity of the rubber.

24. In the process of making articles of rubber, the step which comprises plasticizing unvulcanized rubber by subjecting the rubber to the action of a small amount of a complex organic compound, which is a chemical addition product of one mole of the chloride of a divalent metal between lithium and lead in the electromotive series and two moles of an unsymmetrically substituted hydrazine in which only one nitrogen carries substituents, each substituent being an organic group joined to the nitrogen by means of a carbon atom, for a sufficient length of time to produce a substantial increase in the plasticity of the rubber.

25. In the process of making articles of rubber, the step which comprises plasticizing unvulcanized rubber by subjecting the rubber to the action of a small amount of a complex organic compound, which is a chemical addition product of one mole of the chloride of a divalent metal between lithium and lead in the electromotive series and two moles of a mono-substituted hydrazine in which the substituent is an aromatic group having a ring carbon atom thereof directly bonded to a nitrogen of the hydrazine nucleus, for a sufficient length of time to produce a substantial increase in the plasticity of the rubber.

26. In the process of making articles of rubber, the step which comprises plasticizing unvulcanized rubber by subjecting the rubber to the action of a small amount of a complex organic compound, which is a chemical addition product of one mole of the chloride of a divalent metal between lithium and lead in the electromotive series and two moles of phenyl hydrazine, for a sufficient length of time to produce a substantial increase in the plasticity of the rubber.

27. In the process of making articles of rubber, the step which comprises plasticizing unvulcanized rubber by subjecting the rubber to the action of a small amount of a complex organic compound, which is a chemical addition product of one mole of zinc chloride and two moles of an unsymmetrically substituted hydrazine having at least one valence of at least one nitrogen of the hydrazine nucleus satisfied by a hydrogen atom and in which each substituent is an organic group joined to the nitrogen by means of a carbon atom, for a sufficient length of time to produce a substantial increase in the plasticity of the rubber.

28. In the process of making articles of rubber, the step which comprises plasticizing unvulcanized rubber by subjecting the rubber to the action of a small amount of a complex organic compound, which is a chemical addition product of one mole of zinc chloride and two moles of phenyl hydrazine, for a sufficient length of time to produce a substantial increase in the plasticity of the rubber.

29. In the process of making articles of rubber, the step which comprises plasticizing unvulcanized rubber by subjecting the rubber to the action of a small amount of a complex organic compound, which is a chemical addition product of one mole of cadmium chloride and two moles of phenyl hydrazine, for a sufficient length of time to produce a substantial increase in the plasticity of the rubber.

30. In the process of making articles of rubber, the step which comprises plasticizing unvulcanized rubber by subjecting the rubber to the action of a small amount of a complex organic compound, which is a chemical addition product of one mole of lead chloride and two moles of phenyl hydrazine, for a sufficient length of time to produce a substantial increase in the plasticity of the rubber.

31. Unvulcanized rubber of increased plasticity obtainable by subjecting the rubber to the action of a small amount of a complex organic compound, which is a chemical addition product of a chloride of a metal between lithium and lead in the electromotive series and an unsymmetrically substituted hydrazine having at least one valence of at least one nitrogen of the hydrazine nucleus satisfied by a hydrogen atom and in which each substituent is an organic group joined to the nitrogen by means of a carbon atom, for a sufficient length of time to produce a substantial increase in the plasticity of the rubber.

32. Unvulcanized rubber of increased plasticity obtainable by subjecting the rubber to the action of a small amount of a complex organic compound, which is a chemical addition product of a chloride of a metal between lithium and lead in the electromotive series and an unsymmetrically substituted hydrazine in which only one nitrogen carries substituents, each substituent being an organic group joined to the nitrogen by means of a carbon atom, for a sufficient length of time to produce a substantial increase in the plasticity of the rubber.

33. Unvulcanized rubber of increased plasticity obtainable by subjecting the rubber to the action of a small amount of a complex organic compound, which is a chemical addition product of a chloride of a metal between lithium and lead in the electromotive series and phenyl hydrazine, 34. Unvulcanized rubber of increased plasticity obtainable by subjecting the rubber to the action of a small amount of a complex organic compound, which is a chemical addition product of a metal salt and phenyl hydrazine, for a sufficient length of time to produce a substantial increase in the plasticity of the rubber.

35. Unvulcanized rubber of increased plasticity obtainable by subjecting the rubber to the action of a small amount of a complex organic compound, which is a chemical addition product of one mole of the chloride of a divalent metal between lithium and lead in the electromotive series and two moles of an unsymmetrically substituted hydrazine in which only one nitrogen carries substituents, each substituent being an organic group joined to the nitrogen by means of a carbon atom, for a sufficient length of time to produce a substantial increase in the plasticity of the rubber.

36. Unculcanized rubber of increased plasticity obtainable by subjecting the rubber to the action of a small amount of a complex organic compound, which is a chemical addition product of one mole of zinc chloride and two moles of phenyl hydrazine, for a sufficient length of time to produce a substantial increase in the plasticity of the rubber.

37. Unvulcanized rubber of increased plasticity obtainable by subjecting the rubber to the action of a small amount of a complex organic compound, which is a chemical addition product of one mole of cadmium chloride and two moles of phenyl hydrazine, for a sufficient length of time to produce a substantial increase in the plasticity of the rubber.

38. Unvulcanized rubber of increased plasticity obtainable by subjecting the rubber to the action of a small amount of a complex organic compound, which is a chemical addition product of one mole of lead chloride and two moles of phenyl hydrazine, for a sufficient length of time to produce a substantial increase in the plasticity of the rubber.

IRA WILLIAMS.
CARROLL CUMMINGS SMITH.